United States Patent [19]

Ostendorf et al.

[11] 4,197,754
[45] Apr. 15, 1980

[54] APPARATUS FOR MEASURING OR MONITORING CHANGES IN THE PERIPHERY OF A VESSEL

[75] Inventors: Hermann Ostendorf, Krefeld; Ernst P. Warnke, Kerken, both of Fed. Rep. of Germany

[73] Assignee: Siempelkamp Giesserei GmbH & Co., Krefeld, Fed. Rep. of Germany

[21] Appl. No.: 907,414

[22] Filed: May 18, 1978

[30] Foreign Application Priority Data

Jan. 27, 1978 [DE] Fed. Rep. of Germany ....... 2803520

[51] Int. Cl.² .............................................. G01B 5/30
[52] U.S. Cl. ...................................... 73/781; 73/756; 73/760; 73/786
[58] Field of Search ................ 73/88 R, 89, 700, 704, 73/756, 760, 781, 782, 786; 33/147 D, 148 D, DIG. 13

[56] References Cited

U.S. PATENT DOCUMENTS

| 1,468,383 | 9/1923 | Guy | 73/88 R |
|---|---|---|---|
| 1,806,350 | 5/1931 | Hire | 73/88 R X |
| 3,092,912 | 6/1963 | Reed | 33/147 D |
| 3,412,600 | 11/1968 | Powell et al. | 73/88 R |
| 3,546,944 | 12/1970 | Mack | 73/88 R |
| 3,696,512 | 10/1972 | von Marinelli et al. | 33/147 D |
| 3,914,991 | 10/1975 | Fletcher et al. | 73/782 X |
| 4,070,906 | 1/1978 | Rupert et al. | 73/786 X |

FOREIGN PATENT DOCUMENTS 838512 7/1949 Fed. Rep. of Germany .

Primary Examiner—Charles Gorenstein
Attorney, Agent, or Firm—Karl F. Ross

[57] ABSTRACT

An apparatus for measuring or monitoring changes in the periphery of a vessel, especially a pressure vessel for containment of a nuclear-reactor core, comprises a wire which extends around the periphery of the vessel and is held along this periphery by a plurality of mechanical elements establishing a predetermined spaced relationship between the wire and the periphery. The wire extends polygonally around these elements and is provided with a displacement-measuring device responsive to any tendency of the wire to shift from its original position. According to the invention, the connecting elements between the wire and the periphery of the vessel are constituted as sheet-metal plates or vanes lying in planes substantially perpendicular to the axis of the wire and extending radially with respect to the axis of the vessel. The vanes are elastically deformable laterally or shiftable in the direction of the axis of the wire and are retained under tension by the tension applied to the wire.

10 Claims, 5 Drawing Figures

APPARATUS FOR MEASURING OR MONITORING CHANGES IN THE PERIPHERY OF A VESSEL

FIELD OF THE INVENTION

The present invention relates to a system for measuring or monitoring changes in the periphery of a structure and, more particularly, to a system for monitoring and measuring changes in the periphery of pressure vessels such as those used to contain nuclear-reactor cores.

BACKGROUND OF THE INVENTION

It is known to provide a system for measuring or monitoring changes in the periphery of a pressure vessel which makes use of a measuring wire extending along the periphery of the vessel and maintained under mechanical tension. The wire is provided with a displacement-detecting circuit which responds to the displacement of one or both ends of the wire and generates a signal representing a measured detection of the change in the periphery of the structure from its original configuration or size.

Such systems are highly useful in monitoring the ability of a pressure vessel to resist internal forces and to signal the possible failure of the vessel to operating or vicinal personnel so that injuries in nuclear power plants, chemical process plants and the like can be eliminated or avoided.

Naturally, when a pressure vessel of the type described is subjected to stress, the most common response of the walls of the vessel is an enlargement or distortion thereof. Such enlargements and distortions are readily monitored by a signaling system of the character described.

Such systems and those described with respect to the present invention below, may be used for pressure vessels of the type described in U.S. Patent Application Ser. No. (894,374), filed April 7, 1978 by Lothar Gülicher.

In the prior-art use of an endless wire or a wire fixed at one end for the purpose described, a polygonal configuration is imparted to the wire, even in the case in which the periphery of the vessel is cylindrical, because the wire is held in a predetermined spaced relationship with the periphery of the vessel by a plurality of equispaced wire retaining elements.

For the present purposes, a "measurement" in the sense of the invention is a detection of the magnitude of any change in the periphery of the vessel. "Monitoring", however, represents the detection of a change in the periphery of the vessel, and the generation of a signal as a result of this change when it exceeds a threshold value. Thus, in the case of peripheral measurement, the measuring precision is of interest whereas, for periphery monitoring, the sensitivity is of the greater significance.

In the prior art systems described, for example, in the German patent DT-PS No. 838,512, the connecting elements between the wire and the periphery of the structure are of the needle-bearing type. The needle-bearing configuration is intended to reduce the effect of friction to the minimum. However, experience has shown that such rolling elements increase the friction, decrease precision and reduce sensitivity, presumably because of the friction between the wire and the peripheries of these rolling elements and between the latter and the periphery of the vessel or structure which is to be measured or monitored.

OBJECTS OF THE INVENTION

It is the principal object of the present invention to provide a system for the purposes described, which will have high measurement precision and monitoring sensitivity, which will be unaffected by uncontrolled frictional influences, and which, as a whole, will represent an improvement over prior art devices for measuring the periphery of a structure or monitoring changes in the periphery thereof.

Another object of the invention is to provide an apparatus or system for measuring or monitoring changes in the periphery of a cylindrical pressure vessel, especially a pressure vessel which may be used as a nuclear-reactor core housing, whereby disadvantages of earlier measurement and monitoring systems are eliminated.

SUMMARY OF THE INVENTION

These objects and other which will become apparent hereinafter are attained, in accordance with the instant invention, in a system for measuring or monitoring the changes in the periphery of a structure and particularly a cylindrical pressure vessel, the system comprising a wire extending around the periphery (either internal or external) and spaced from the periphery of the latter by spacing or connecting elements so that the wire, which is maintained under tension, has a polygonal configuration. Between at least one end of the wire and another element, e.g. the other end of the wire or a fixed portion of the vessel, there is provided a displacement-detector means, e.g. a strain-gauge circuit, position-measuring system or the like, adapted to provide an output signal representing the degree of relative displacement of this end of the wire and the other element, and, when monitoring is required, to generate a warning signal when this first-mentioned signal exceeds a predetermined threshold value.

According to the present invention, the connecting elements are sheet-metal vanes, plates or strips whose planes are substantially octhogonal to the axis of the measuring wire and which are elastically deformable or limitedly displaceable in the direction in which the wire runs. According to the invention, moreover, these vanes are maintained under tension by the tension applied to the measuring wire. In other words, where the vane is held along the periphery at one end of the vane, the wire engages the vane in such manner as to stress the vane away from the anchored location.

According to a preferred feature of the invention, the system is so constructed that the sheet-metal vanes are provided with openings through which the wire passes and the wire is simply passed through or laid into these openings. In an embodiment of the invention in which the system is used for measuring changes in the dimensions of a vessel or monitoring the distortion of the periphery of the vessel while being located in the interior of the vessel, the vanes are afixed to the inner wall of the vessel directly and the wire passes through the openings in these vanes and is placed under tension to draw the free ends of the vanes inwardly and apply the aforementioned tension.

In the embodiment in which the wire extends around the outer periphery of the vessel, the vanes are preferably held at their outer ends by brackets affixed to the outer periphery of the vessel and reaching around the vanes. The free inner ends of the vanes are then provided with the openings which are traversed by the wire, the latter being under tension to draw the vanes inwardly and apply the aforementioned tensile stress to the vanes between the wire and their anchorages to the respective brackets.

According to still another feature of the present invention, the sheet-metal vanes are composed of spring steel. It will, of course, be understood that the elastic deformability of the sheet-metal vanes on the one hand and the mechanical tensile stress of the wire and as applied to the vanes on the other must be such that the slightest change in the periphery of the vessel will result in a movement of the measuring wire in its longitudinal direction and, consequently, elastic deformation of the sheet-metal vanes with a minimum of resistance. However, perpendicular to the wire axis, the relatively large resistance of the broad side of the vanes prevents buckling of the wire perpendicular to the axial direction of the wire.

Reference to the axis of the wire and axial direction thereof should be understood to refer to the axis of the wire which is tangent to the wire configuration at each of the vanes respectively. Naturally, if the wire is extremely rigid and will not form a polygon when passed through the vanes even for a cylindrical vessel, the axis to which the vane is perpendicular is the axis of the wire which is tangent to the pattern defined thereby. The same also applied when the wire assumes a polygonal shape because it is somewhat more flexible.

Naturally, the elastic deformation of one of the sheet-metal vanes is translated immediately into a change in the position of the wire which acts upon the displacement sensor. Consequently, the system carries out a translation of the changes in the configuration of the periphery of the vessel into a magnitude which can be measured or detected. In fact, the deformation or lateral deflection of these vanes had been found to increase the precision of peripheral measurement. In addition, the use of the system for distortion monitoring of the periphery of the vessel shows greater sensitivity to changes in the peripheral dimensions and shapes.

When the system of the present invention has a peripheral wire simply lying in the openings of the vanes, it is found that no relative movement takes place between the wire and the vanes so that there is no friction force which can give rise to reduced precision or sensitivity. This is because the vanes form the corners of the polygon and deflect with movement of the wire. Since the wire bends slightly at each opening around an edge of the vane, special clamping means are not required to secure the wire relative to the vanes. Of course, the wire can be allowed to be shiftable relative to the vanes without any difficulty.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
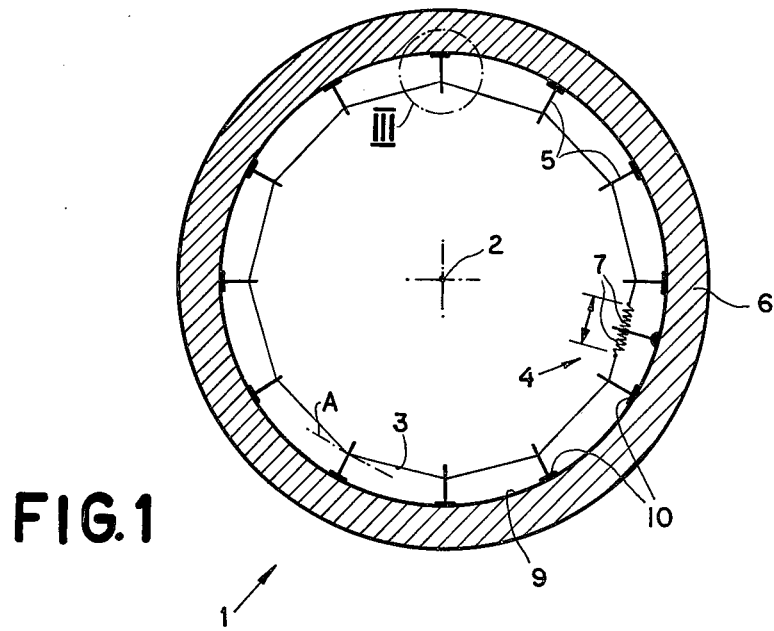
FIG. 1 is a horizontal cross-sectional view through a nuclear-reactor core housing or vessel provided with a system according to the present invention.

In the drawing we have shown the principles of the present invention as applied to internal and external peripheral measurement and monitoring for a cylindrical vessel which may be used to receive a nuclear-reactor core as described in the aforementioned copending application.

In each case the cylindrical vessel 1 has a vertical axis and is shown in a horizontal cross section. The cross section is, of course, taken perpendicular to the axis 2 of the vessel.

In accordance with the principles set forth in the aforementioned copending application, the vessel 1 can consist of steel, cast steel, concrete or the like and can be provided with peripheral and/or vertical reinforcements.

The vessel 1 is, in each case, provided with a system for measurement of changes in the periphery and/or monitoring these changes in the sense of the foregoing definition. The system comprises, in common with prior art arrangements, a peripheral measuring wire 3 which is under mechanical tension and has a polygonal configuration while extending along the periphery of the vessel. The system also includes a displacement detector generally represented at 4 and shown in somewhat greater detail in FIG. 5.

Figure 5:
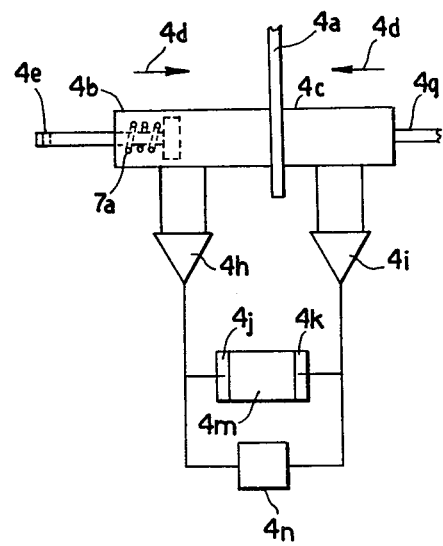
FIG. 5 is a view illustrating another aspect of the invention.

The system of FIG. 5 includes a support 4a upon which are stators 4b and 4c of a pair of linear differential transformers (see pages 65 ff. of SERVOMECHANISM PRACTICE, McGraw-Hill Book Co., New York, 1960), the movable core 4e and 4g of which can be connected to the ends of the measuring wire 3. In this case, the springs which tension the wire are shown at 7a and urge the cores inwardly (arrows 4d) as is also apparent from FIG. 5.

In accordance with the principles set forth in SERVOMECHANISM PRACTICE (supra) the outputs of the LVDTs 4b and 4c are applied through respective amplifiers 4h and 4i to threshold circuits 4j and 4k which operate, when the measured value exceeds a predetermined threshold, an alarm or indicator 4m. These units may also be connected to a display circuit 4n which displays the numerical value of the change and dimensions of the periphery of the vessel. It will be apparent that the system of FIG. 5 is applicable both to the external peripheral arrangement of FIG. 2 and the internal peripheral arrangement of FIG. 1. Referring again to FIG. 1, it will be apparent that the measuring wire 3 is maintained under tension by the springs 7 against a support, e.g. the support 4a previously described. Because the wire is under tension and is flexible, it forms a slight bend as it passes through the eye 8 of each connecting vane 5 fixed to the inner wall of the vessel 6. Thus the wire 3 has a polygonal configuration.

Figure 3:
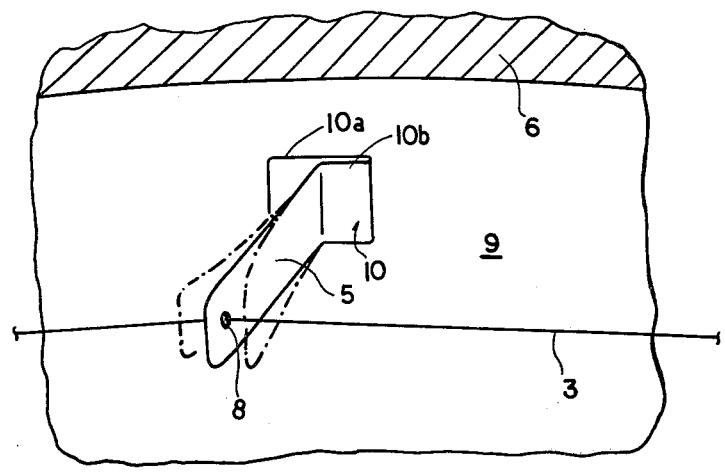
FIG. 3 is a detailed view of the region represented at III in FIG. 1.

The vanes 5, as will be apparent from FIG. 3, are formed as sheet-metal spring steel plates whose free ends are formed with the eyes 8 through which the wire 3 passes freely. The vanes may be deflected laterally as shown by the dot-dash line positions in FIG. 3 and are secured by respective feet 10 to the inner wall 9 of the vessel 6 to facilitate deflection, the feet 10 may have a base 10a over which is folded a portion 10b parallel to the base 10a and from which the vane 5 is bent practically at a right angle. Each vane 5 lies in an axial plane of the cylindrical vessel along a radius from the center 2 thereof.

The plane of the vane is practically perpendicular to the axis A of the wire, this axis being the tangent to the wire configuration as shown in FIG. 1 at the vertex of the polygon formed by the wire at each vane.

The vanes 5 are thus elastically deformable in the direction of the axis of the wire and are maintained under tensile stress by the inward force applied by the wire. To assemble the installation of FIG. 1, the vanes 5 are mounted on the wall of the vessel and the measuring wire 3 is then threaded through the openings 8. The attachment of the vanes can be by adhesion, (e.g. a cement or glue) by welding or bolting or in some other convenient fashion.

Figure 2:
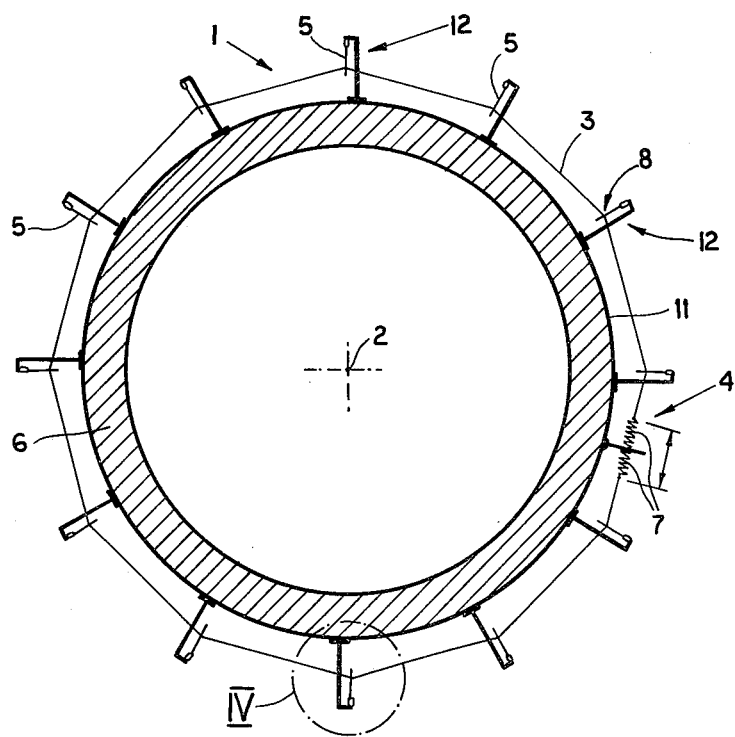
FIG. 2 is a cross-sectional view similar to FIG. 1 but illustrating another embodiment of the invention.
Figure 4:
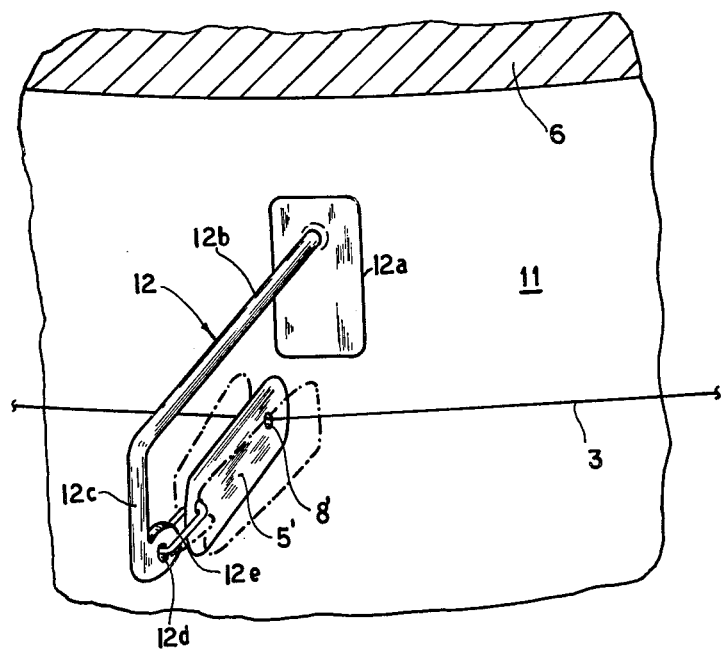
FIG. 4 is a detailed view of the region represented at IV in FIG. 2.

In the embodiment of FIGS. 2 and 4, which is intended for monitoring and measuring the changes and shape of the vessel along the external periphery thereof, the wire 3 passes through the eyes 8' of a sheet-metal spring steel link 5' held against inward movement by a bracket 12.

The bracket 12, which also lies in a radial plane (see FIG. 2) comprises a base 12a which may be adhered to the outer wall 11 of the vessel, an arm 12b which projects from this base and is perpendicular thereto, a further arm 12c unitary with but perpendicular to arm 12b, and an eye 12d at the end of arm 12c. A metal link 12e can pass through the eye 12d and through a further eye 8a of the vane 5' to support the latter so that it may be deflected to either side of its normal position as shown in dot-dash lines in FIG. 4. The sheet-metal vanes 5 and 5' can be composed of spring steel and the vane 5' may be fixed rigidly at its outer end to the arm 12c if desired. Naturally, a single wire 3 can encircle the axis of the vessel in a plurality of turns or a plurality of such wires can be used. In either case, each vane may receive a plurality of passes or each pass may be held in spaced relation with the wall of the vessel by separate vanes.

We claim:

1. A device for measuring or monitoring the deformation of a peripheral wall of a vessel comprising:
    a plurality of spacers mounted on said wall in angularly spaced relation to one another therealong, each of said spacers including a laterally deflectable vane secured at one end to said wall and having a free end, each vane lying substantially transverse to said wall;
    a measuring wire extending along said wall and the periphery of the vessel and engaging the free ends of said vanes so as to be spaced by said vanes from said wall, said wire defining a substantially closed polygon surrounding the center of said vessel;
    means for tensioning said wire to apply tension to said vanes between the ends thereof; and
    position detector means connected to said wire for producing an output signal upon a displacement of said wire resulting from a distortion of said vessel at said wall.

2. The device defined in claim 1 wherein said vanes are each formed at their free ends with a respective opening, said wire being simply threaded through said opening.

3. The device defined in claim 2 wherein brackets are provided in spaced relationship along said wall and said wall is an outer wall of said vessel, said vanes being tensioned inwardly by said wire, said vanes being substantially perpendicular to the axis of the wire at the vertices of the polygon formed by the wire as it passes through said vanes.

4. A device for measuring or monitoring the deformation of a wall of a vessel comprising:
    a plurality of spacers mounted on said wall in spaced relation to one another therealong, each of said spacers including a laterally deflectable vane secured at one end to said wall and having a free end, each vane lying substantially transverse to said wall;
    a measuring wire extending along said wall and engaging the free ends of said vanes so as to be spaced by said vanes from said wall;
    means for tensioning said wire to apply tension to said vanes between the ends thereof; and
    position detector means connected to said wire for producing an output signal upon a displacement of said wire resulting from a distortion of said vessel at said wall, said vanes being each formed at their free ends with a respective opening, said wire being simply threaded through said openings, said wall being the inner wall of said vessel and said vanes being affixed to and project inwardly from said wall, said wire encircling an axis of said vessel and defining a closed polygon therein, said vanes extending substantially perpendicular to the axis of said wire at vertices of said polygon.

5. A device for measuring or monitoring the deformation of a wall of a vessel comprising:
    a plurality of spacers mounted on said wall in spaced relation to one another therealong, each of said spacers including a laterally deflectable vane secured at one end to said wall and having a free end, each vane lying substantially transverse to said wall;
    a measuring wire extending along said wall and engaging the free ends of said vanes so as to be spaced by said vanes from said wall;
    means for tensioning said wire to apply tension to said vanes between the ends thereof; and
    position detector means connected to said wire for producing an output signal upon a displacement of said wire resulting from a distortion of said vessel at said wall, said vanes being each formed at their free ends with a respective opening, said wire being simply threaded through said openings said vanes being composed of spring steel.

6. A device for measuring or monitoring the deformation of a wall of a vessel comprising:
    a plurality of spacers mounted on said wall in spaced relation to one another therealong, each of said spacers including a laterally deflectable vane secured at one end to said wall and having a free end, each vane lying substantially transverse to said wall;
    a measuring wire extending along said wall and engaging the free ends of said vanes so as to be spaced by said vanes from said wall;
    means for tensioning said wire to apply tension to said vanes between the ends thereof; and
    position detector means connected to said wire for producing an output signal upon a displacement of said wire resulting from a distortion of said vessel at said wall, said vanes being each formed at their free ends with a respective opening, said wire being simply threaded through said openings, said vessel being a cylindrical pressure vessel for a nuclear reactor core and said vanes lying substantially along radii of the vessel, said wire extending around the axis of said vessel in a horizontal plane to form a polygon, said vanes being perpendicular to the axis of said wire at respective vertices of the polygon.

7. The device defined in claim 6 wherein opposite ends of the wire are retained by springs against a common support to tension said wire.

8. The device defined in claim 6 wherein said vanes and said wire are disposed within said vessel.

9. The device defined in claim 6 wherein said vanes and said wire are disposed externally of said vessel.

10. A method of measuring or monitoring the change of shape of a vessel comprising the steps of:
   encircling the axis of said vessel with at least one wire;
   retaining said wire in spaced relationship with a wall of said vessel by connecting one side of a deflectable vane to the wall at each of a plurality of locations angularly spaced about said axis and passing the wire through free ends of the vanes;
   tensioning the wire so as to form the same into a polygonal configuration and apply tension to each of said vanes; and
   generating an output signal upon the displacement of said wire representing a distortion of said vessel.

* * * * *